Figure 1:
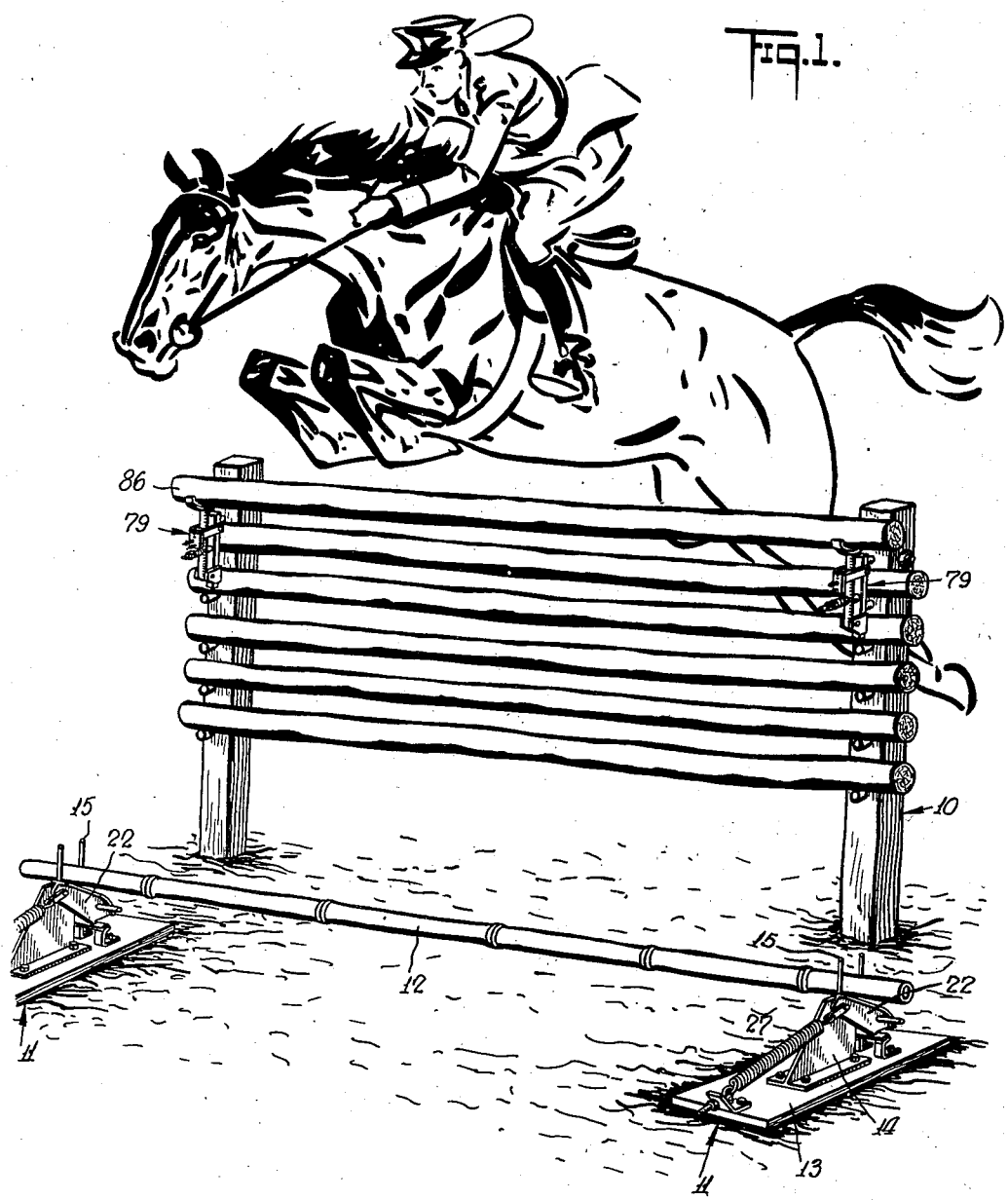

April 14, 1942.  C. W. VOGT ET AL  2,279,539
HORSE TRAINING APPARATUS
Filed Dec. 7, 1939  5 Sheets-Sheet 1

INVENTORS
Clarence W. Vogt
Eino E. Lakso
BY
ATTORNEYS

April 14, 1942.
C. W. VOGT ET AL
2,279,539
HORSE TRAINING APPARATUS
Filed Dec. 7, 1939
5 Sheets-Sheet 2
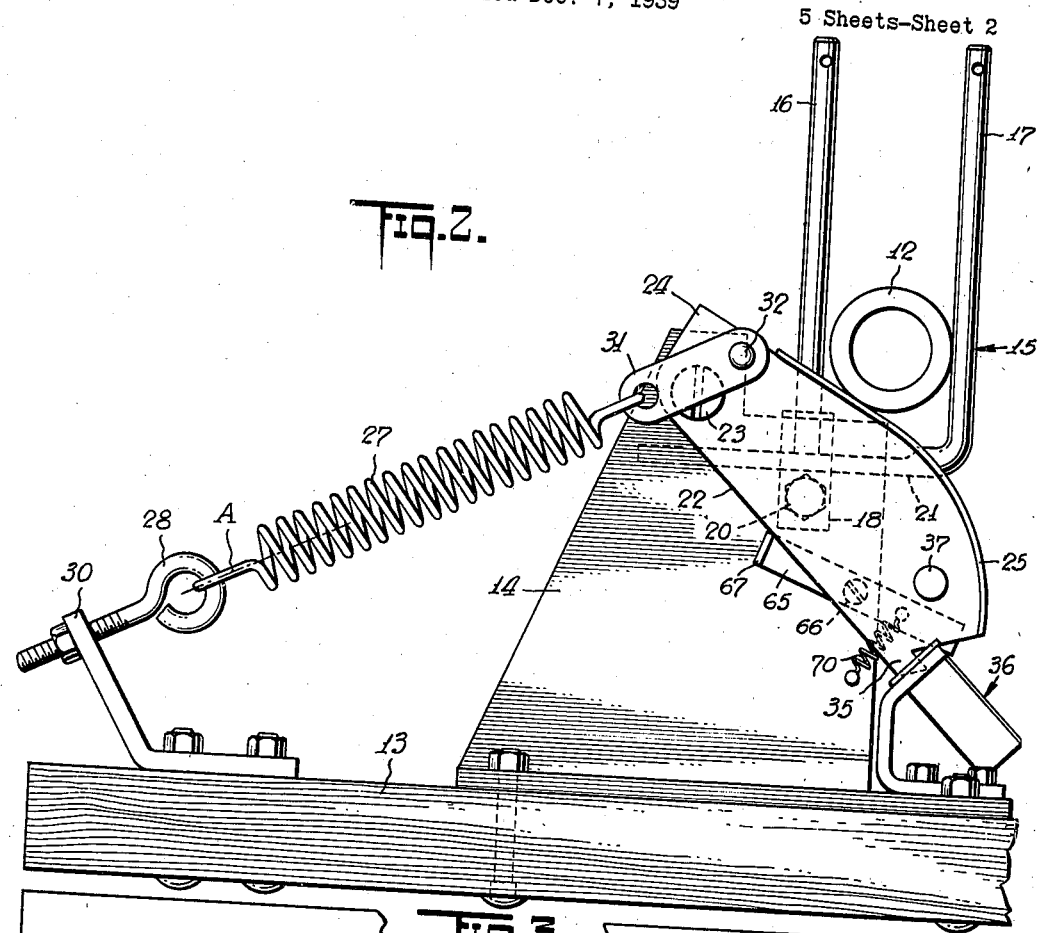
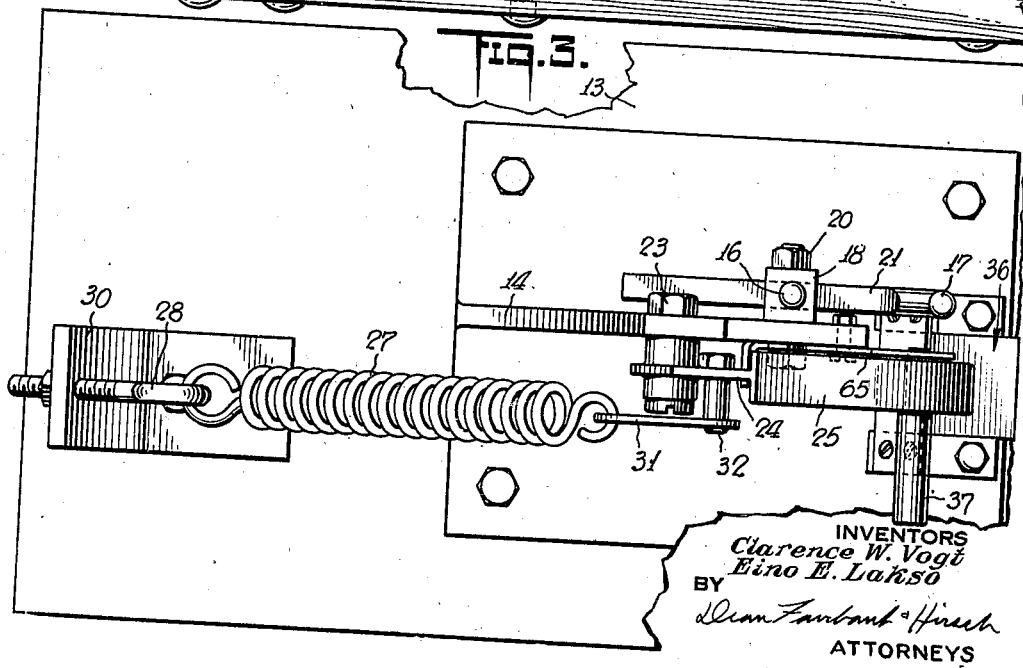
INVENTORS
Clarence W. Vogt
Eino E. Lakso
BY
Dean Fairbank & Hirsch
ATTORNEYS April 14, 1942. C. W. VOGT ET AL 2,279,539
HORSE TRAINING APPARATUS
Filed Dec. 7, 1939 5 Sheets-Sheet 3
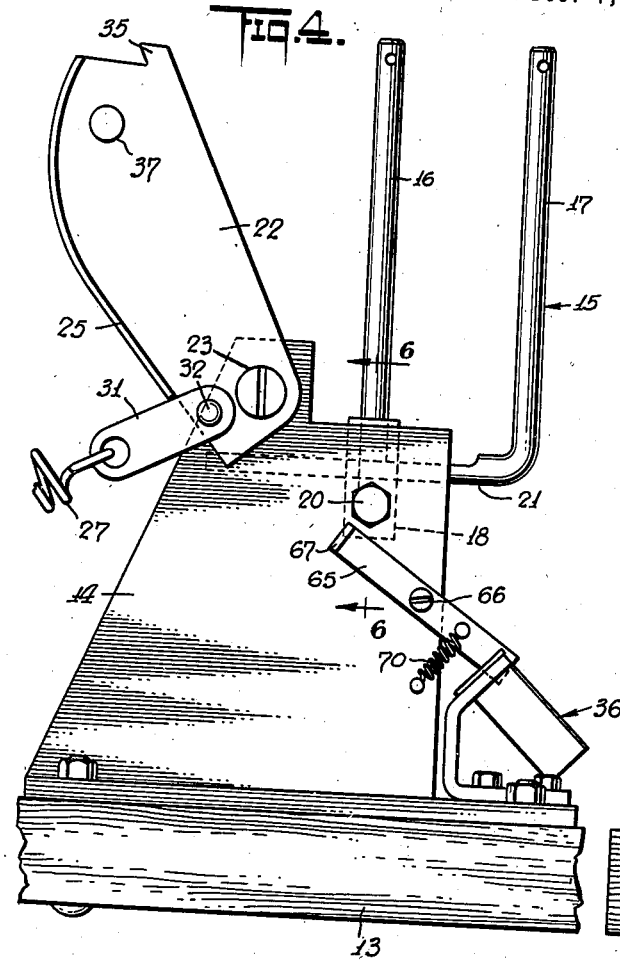
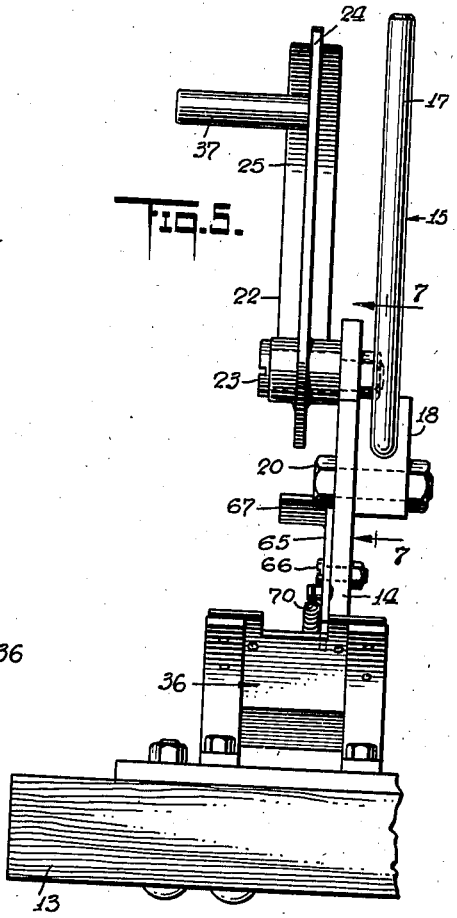
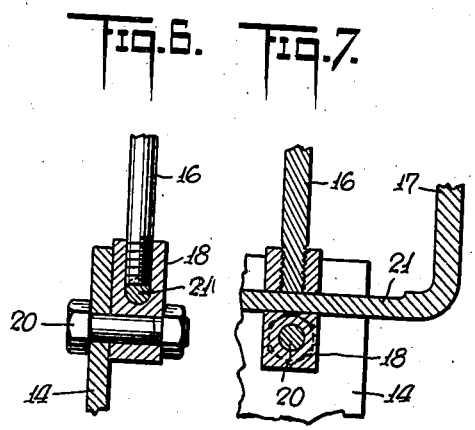
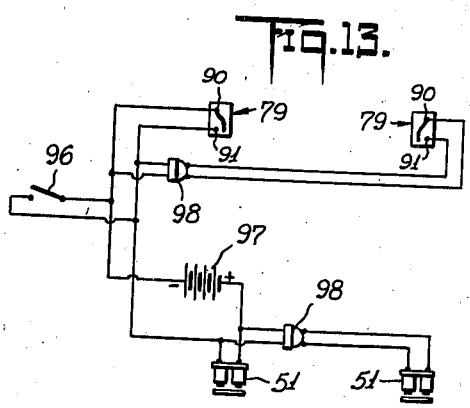
INVENTORS
Clarence W. Vogt
Eino E. Lakso
BY
Dean Fairbank & Hirsch
ATTORNEYS April 14, 1942.                C. W. VOGT ET AL                2,279,539
                            HORSE TRAINING APPARATUS
                               Filed Dec. 7, 1939                5 Sheets-Sheet 4
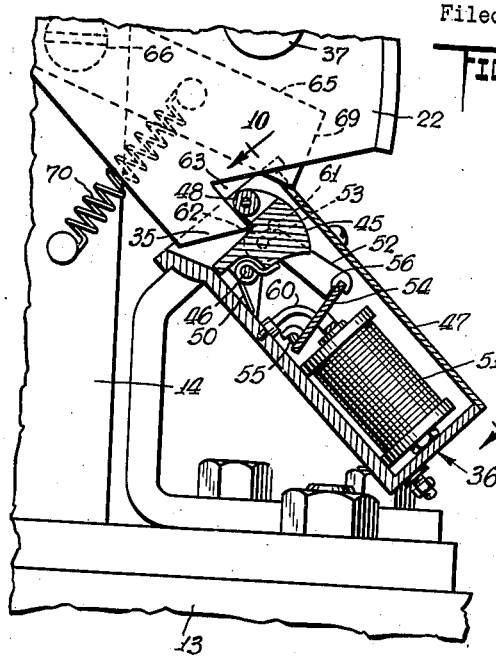
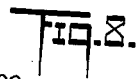
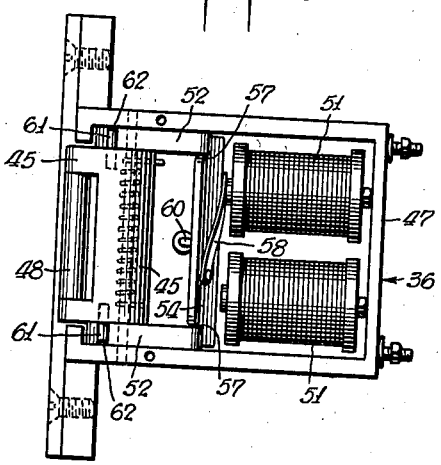
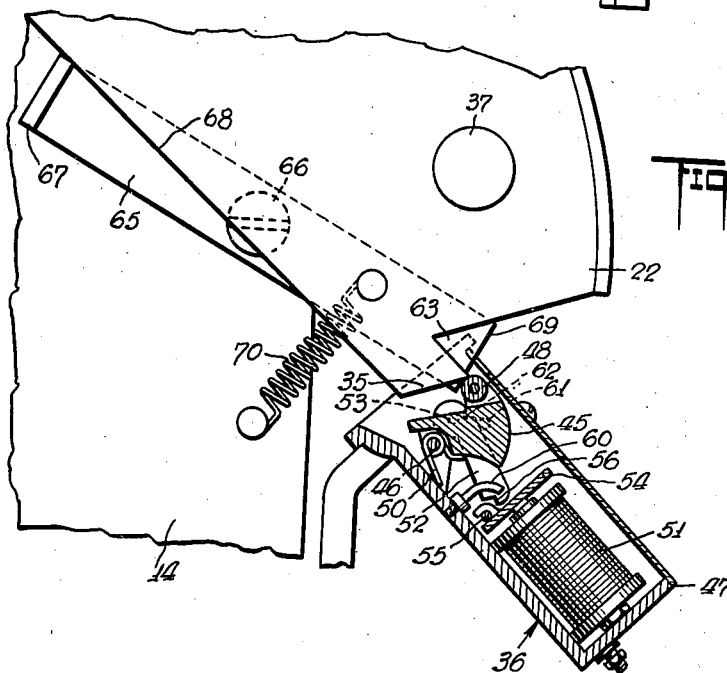
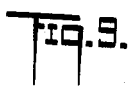
INVENTORS
Clarence W. Vogt
Eino E. Lahso
BY
ATTORNEYS

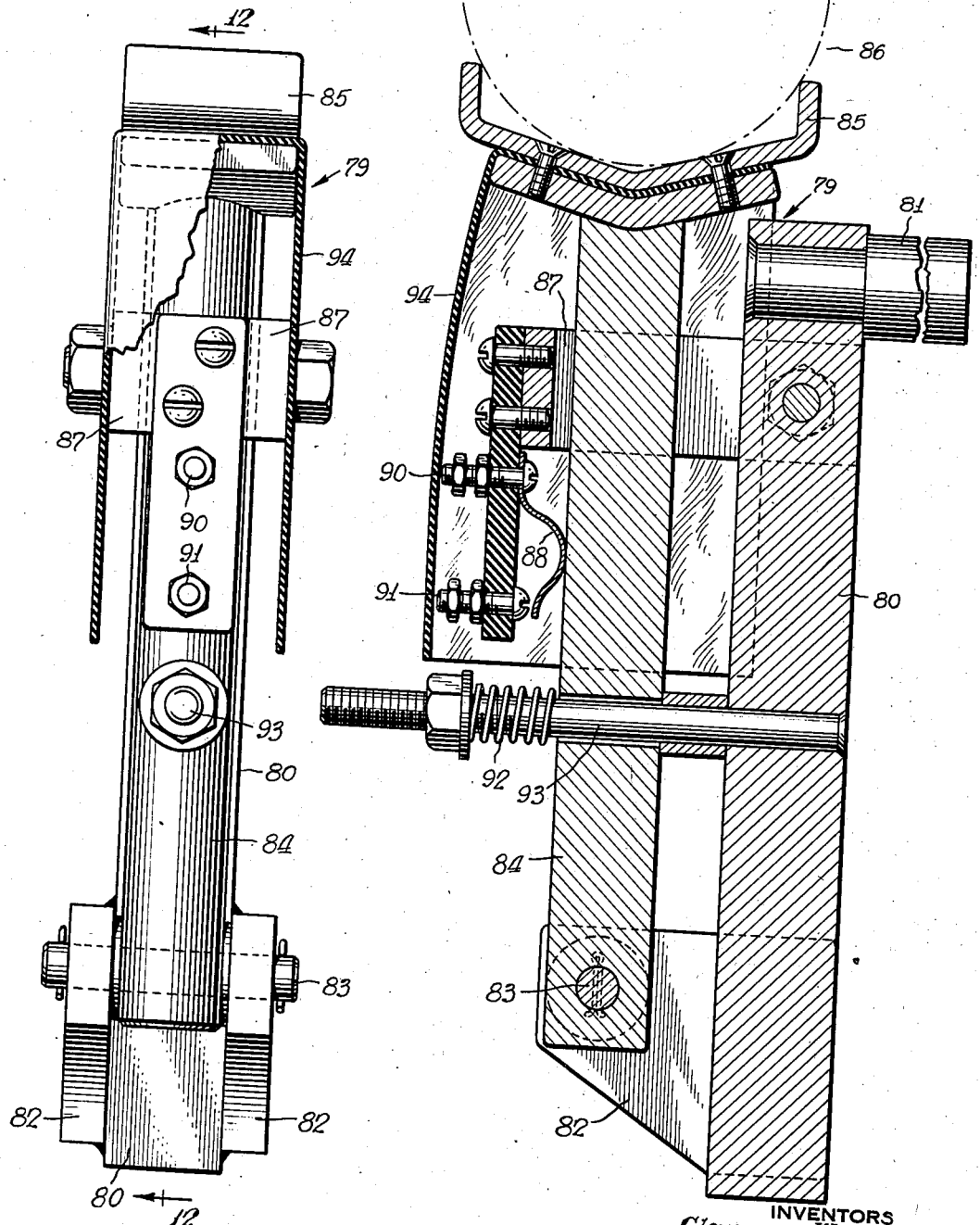

Patented Apr. 14, 1942

2,279,539

UNITED STATES PATENT OFFICE 2,279,539

HORSE TRAINING APPARATUS

Clarence W. Vogt, Norwalk, Conn., and Eino E. Lakso, Fitchburg, Mass.; said Lakso assignor to said Vogt Application December 7, 1939, Serial No. 307,958

13 Claims. (Cl. 119—29)

In schooling a horse for hurdle jumping, the manual poling of the horse by the trainer while standing at one side of the hurdle is unsatisfactory from a horse training standpoint, since the horse so trained will have a tendency to become lax in his jumping when he sees no one standing alongside of the hurdle.

One object of the present invention is to provide a horse training device having means capable of hurling a missile at a horse as he leaps over a hurdle.

Another object is to provide a horse training device for hurling a pole against the underside of a horse as he jumps over a hurdle, and the operation of which is automatically initiated by the horse himself if he fails to completely clear the hurdle.

Another object is to provide a horse training device which hurls a pole against the underside of a horse as he jumps over a hurdle, and which can be set off by an operator remote from the hurdle.

Another object is to provide a horse training device, which hurls a pole against the underside of a horse as he leaps over the hurdle, and which can be either automatically set off by the horse himself when he tips the top rail of the hurdle or can be set off by an operator remote from the hurdle.

Various other objects, features and advantages of the invention will be apparent from the following particular description, and from an inspection of the accompanying drawings, in which:

Fig. 1 is a perspective view of a horse training device embodying the present invention, and shown set up in conjunction with a hurdle, Fig. 2 is a side elevation of one of the catapult units shown in a cocked position, Fig. 3 is a top plan view of the catapult unit shown in cocked position, Fig. 4 is a fragmentary side elevation of the catapult unit shown in released position, Fig. 5 is a rear elevation of the released catapult unit, Fig. 6 is a section taken on line 6—6 of Fig. 4, Fig. 7 is a section taken on line 7—7 of Fig. 5, Fig. 8 is a fragmentary view partly in side elevation and partly in section of the catapult unit, and showing the details of the latch mechanism in cocked position, Fig. 9 is a view similar to that of Fig. 8, but showing the latch mechanism in released position, Fig. 10 is a section taken on line 10—10 of Fig. 8, Fig. 11 is a front elevation of one of the switch devices for automatically controlling the operation of the catapult units, Fig. 12 is a section taken on line 12—12 of Fig. 11, and Fig. 13 is a wiring diagram somewhat diagrammatic of the horse training device.

The horse training device of the present invention is shown in Fig. 1 in conjunction with a hurdle 10, and comprises a pair of duplicate catapult units 11, mounted forwardly of said hurdle, and which may be released to hurl a missile such as a bamboo pole 12 against the underside of the horse as he leaps over said hurdle. These catapult units 11 may be operated by remote manual control, or may be automatically operated by the horse himself in case he fails to clear the hurdle, as will be more fully described.

Each of the catapult units 11 shown in Figs. 2 to 7 comprises a base 13, and a bracket 14 affixed to said base, and supporting a U-shaped pole holder 15. This pole support 15 is adjustable for pole firing direction, and to accommodate poles of different diameters. For that purpose, a block 18 is secured to one side of the bracket 14 by means of a pivot bolt 20, and has threaded through its top a rod 16, constituting one arm of the pole holder, the other arm being formed by a rod 17 having an angular portion 21 extending loosely through the side of said block and underneath the rod 16 in engagement therewith as shown in Figs. 6 and 7. The rod 16 thereby serves not only as one of the arms of the pole support, but also serves as a set screw for holding the rod 17 in adjusted position with respect to said rod 16. The angular position of the pole support 15 may be adjusted by loosening the bolt 20 and turning the block 18 into desired firing line about said bolt 20.

The pole 12 in the support 15 is hurled against the underside of the horse by means of a propulsion member in the form of a lever 22, which is fulcrumed at 23 to the side of the stand 14 opposite the block 18, and which comprises a substantially flat metal section 24, and a flange 25 along a convex edge thereof defining a cam surface for engagement with said pole. This lever 22 is urged counter-clockwise for pole hurling action as viewed in Fig. 2 by means of a strong coil spring 27, having one end anchored to an eye bolt 28, which is secured to a bracket 30 fixed to the base 13, and which serves to adjust the tension of said spring. The other end of the spring 27 is hooked to a link 31 which is pivotally secured to a pin 32 fixed to the lever 22. The spring illustrated acts by contracting when released by suitable connections. A spring may be employed which acts by expansion from a compressed condition.

The lever 22 is held in cocked position shown in Fig. 2 against the action of the spring 27 by any suitable type of electrically controlled catch. Merely as an example, we have shown a catch 35 at one end of the lever 22, and engaging an electrically controlled lock 36.

When the lever is in cocked position, and when the tension on said spring is greatest as shown in Fig. 2, the center line A of the spring 27 is only a comparatively short distance above the fulcrum point 23. The lever 22 in moving to cocked position carries the center line of the spring toward but not across the dead center position defined by the center of the fulcrum 23. The moving of the lever may be facilitated by a handle 37.

The electric lock 36 for holding the lever 22 in the cocked position shown in Figs. 2 and 8 may be of any suitable construction. In the specific form shown in Figs. 8 to 10, it comprises a latch bolt 45, pivotally mounted at 46 to the side walls of a lock housing 47, and having a roller 48 at its forward end serving as that part of the bolt which engages the lever catch 35. This latch bolt 45 is spring-pressed counter-clockwise into lever locking position shown in Fig. 8 by a suitable spring 50, and is released by an electro-magnet 51, enclosed in the latch housing 47.

For holding the latch bolt 45 in the locked position shown in Fig. 8, there is provided a pair of dogs 52, flanking the ends of said latch bolt, and pivotally mounted at 53 to the side walls of the housing 47. Between these dogs 52 and the electro-magnet 51 is an armature plate 54, pivotally supported on a pin 55, and its upper edge receives the notched ends 56 of the dogs 52 in locked position of the latch bolt 45 shown in Fig. 8. The armature plate 54 is urged away from the pole ends of the electro-magnet 51 by means of a suitable spring 58, and is limited in its angular movement away from said pole ends by a stop 60.

The angular movement of the latch bolt 45 is transmitted to the dogs 52 by means of pins 61, projecting from the ends of said latch bolt, and riding over the upper longitudinal edges of said dogs. During counter-clockwise rotation of the latch bolt 45, these pins 61 snap into respective notches 62 in the upper edges of the dogs 52, and rotate said dogs counter-clockwise into position to be locked as will be more fully described.

The catch 35 at the outer end of the lever 22 has an upper surface 63 with which the latch bolt 45 engages in cocked position of said lever shown in Fig. 8.

When the electro-magnet 51 is de-energized and the catapult unit is cocked, the armature 54 is positioned as shown in Fig. 8 by the action of the spring 58, and the dogs 52 engage the upper edge of said armature, so that they are locked against clockwise rotation. In this position of the dogs 52, the latch bolt 45 engages the surface 63 of the lever 22, and is locked against rotation clockwise by the engagement of the pins 61 against the locked dogs 52.

When the electro-magnet 51 is energized, the armature 54 is attracted into the position shown in Fig. 9, thereby releasing the dogs 52 and permitting them to rotate clockwise. This release of the dogs 52 permits the latch bolt 45 to rotate clockwise against the action of the spring 50, so that the lever 22 is released and permitted to rotate in position to hurl the pole 12 against the underside of the horse.

In order to hold the latch bolt 45 in released position shown in Fig. 9 without the expenditure of further electric current until the lever 22 has been recocked, there is provided a detent 65, pivotally supported at 66 to the bracket 14, and having a transverse flange 67 at one end engaging the lever edge 68, the other end 69 being adapted to engage the roller 48 of the latch bolt 45 when the lever 22 is released to hold said bolt inwardly as shown in Fig. 9. This detent 65 is spring-pressed in a clockwise direction and in this bolt engaging position by a coil spring 70.

Upon clockwise rotation of the lever 22 towards cocked position, the edge 68 thereof engaging the detent flange 67 rotates the detent 65 counter-clockwise against the action of the spring 70, so that the latch bolt 45 is released. At that instant, the recess 63 of the lever 22 will be in position to receive the latch bolt 45 as it rotates counter-clockwise under the action of the spring 50. During this movement of the latch bolt 45, the pins 61 will snap into notches 62 in the dogs 52, so that continued counter-clockwise movement of the latch bolt 45 will cause counter-clockwise rotation of said dogs to a position which will permit the armature 54 to swing away from the magnet poles and into the position shown in Fig. 8 under the action of the spring 58. In this position, the free ends of the dogs 52 will rest on the ends of the armature plate 54 against rotation.

The current to the electro-magnets 51 is controlled either manually by remote control or automatically when the horse fails to clear the top rail of the fence. For automatic control of the electric lock 36, there is provided a pair of switch devices 79 (Figs. 11 and 12), adapted to be mounted on a fence as shown in Fig. 1. In the form shown, each of these switch devices comprises a bracket 80, having a pin 81 adapted to fit in a hole in the post of the fence. Extending forwardly from the lower section of this bracket 80 is a pair of flanges 82, between which is pivotally mounted at 83 an arm 84, carrying at its upper end a U-shaped seat 85 for the top rail 86 of the fence. Also extending forwardly from the bracket 80 is a pair of fingers 87, flanking the arm 84, and carrying a bowed spring contact blade 88, one end of which is fixed to a terminal 90, the other end being adapted to be moved into and out of electrical contact with a terminal 91. The arm 84 is urged away from switch closing position by a light spring 92, encircling a pin 93 which passes loosely through said arm, and which is fixed to the bracket 80.

The electrical contacts of the switch 79 are desirably protected against rainy weather by a suitable mantle 94 of waterproof material.

The spring blade 88 is in contact with the arm 84, so that said arm as it swings counter-clockwise (Fig. 12) by the tipping action of the horse presses said spring until the free end thereof makes contact with the terminal 91. This action closes the circuit of the two electro-magnets 51 in the latch devices 36 of the catapult units 11, and immediately sets off the levers 22 to hurl the pole 12 against the underside of the leaping horse.

If desired, the catapult units 11 can be manually controlled, and for that purpose there is provided a hand switch 96.

In Fig. 13 is shown somewhat diagrammatically a wiring diagram for the various electrical units of the system. In this system, the two electro-magnets 51 of the two catapult units 11 are connected in parallel and connected in series with the two parallel automatic switches 79, and with a battery 97 which is desirably mounted in one of said catapult units. One of the electro-magnets 51 is connected in parallel to the other electro-magnet 51 by a plug 98 to permit separation of the two catapult units 11 for storage or transportation or to permit said units to be used separately. The hand switch 96 is shunted across the two automatic switches 79 by long leads permitting manipulation of said hand switch from a place remote from the fence.

In Fig. 1 is shown the arrangement of the device with respect to the fence 10. In this arrangement, the two catapult units 11 are mounted a few feet forwardly of the fence, and if desired may be covered with brush so as not to arouse the suspicion of the horse. The missile pole 12 extends between the units 11 and seats in the supports 15 thereof.

If the horse in his leap should tip the top rail 86 of the fence, said rail will be pushed forwardly by the sensitive pivotal mounting thereof, so that one or both automatic switches 79 will be closed. This will immediately energize both electro-magnets 51 and release the latch bolts 45 from locking engagement with the levers 22, so that said levers will be released under the strong impulses of the coil springs 27, and will hurl the pole 12 against the underside of the leaping horse. The convex curvature of the lever flange 25 is such as to impart a smooth acceleration to the missile pole 12 as it is catapulted from the device, so that said pole is not subjected to sharp impacts from the propelling lever 22 during this operation.

The horse associating the hurling of the pole with his tipping of the top rail will in his subsequent attempts try to clear the fence.

Even assuming that the horse does clear the fence, but it is desired to train him for higher jumps, the hurling of the pole 12 for that purpose may be controlled by the manual operation of the hand switch 96 from a position remote from the fence. If it is desired to operate solely by manual control, then the use of the automatic switches 79 may be dispensed with. The hand control is also advantageous for training a horse in jumping hurdles which are not of the post and rail type.

In Fig. 1, the battery or other source of electric current, and the electric connections between the circuit closers and the catapult units are not illustrated, as in practice the battery may stand on one of the bases 13 and the electric conductors may be within cables buried beneath the surface of the ground or disposed in any other suitable manner.

Also as far as certain features of the invention are concerned, the top fence rail 36, instead of being in the form of a pole, may constitute a hinged part of a wall fence, the tipping of which part would close the catapult operating switches.

Furthermore, as far as certain aspects of the invention are concerned, for hand control operation the lock 36 need not be of the electric type, but may be manually controlled by means of cables operated from a remote station.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent is:

1. An apparatus for training horses for hurdle jumping comprising a pair of catapult units, each including a spring-pressed propulsion lever, a latch mechanism for cocking said lever against the action of the spring, and means for supporting a pole near one end in the propelling path of action of said lever, whereby said pole is supported between the two units, and means for releasing said lever to hurl said pole against the horse as he leaps over the hurdle.

2. An apparatus for training horses for hurdle jumping comprising catapult means for firing a missile against the underside of a horse as he leaps over the hurdle, and means for operating said catapult means automatically upon failure of the horse to clear said hurdle to hurl said missile.

3. An apparatus for training horses for hurdle jumping comprising catapult means for firing a pole against the underside of a horse as he leaps over the hurdle, and means for operating said catapult means automatically upon failure of the horse to clear said hurdle to hurl said pole.

4. An apparatus for training a horse to jump a hurdle having an upper movable section, comprising catapult means for hurling a missile against the horse as he leaps over the hurdle, and means automatically operable when the horse tips said movable section for operating said catapult means.

5. An apparatus for training a horse to jump a hurdle having a top rail, comprising catapult means for hurling a pole against the underside of the horse as he leaps over the hurdle, and means for operating said catapult means automatically upon tipping of said rail by the leaping horse.

6. An apparatus for training a horse to jump over a hurdle, comprising a catapult mechanism for hurling a pole against the underside of the horse as he leaps over the hurdle, a movable support for the top rail of said hurdle carrying an electric switch closed by the tipping of said rail, and means automatically operable upon the closing of said switch for operating said catapult mechanism.

7. An apparatus for training a horse to jump over a hurdle, comprising a catapult mechanism for hurling a pole against the underside of the horse as he leaps over the hurdle, and having electrically operated latch means for holding said catapult unit in cocked position, supports for the top rail of said hurdle movable by the tipping of said rail by a horse, and an electric switch releasing said electric latch means when closed, and closed by the tipping movement of said supports.

8. An apparatus for training a horse for hurdle jumping, comprising a pair of catapult units for supporting a missile pole therebetween forwardly of the hurdle and for hurling said pole against the underside of the horse as he leaps over the hurdle, and electric switch means closed by the tipping of the upper section of the hurdle for releasing said catapult units for pole firing operation.

9. An apparatus for training a horse for hurdle jumping comprising a catapult device for propelling a pole against a horse as he leaps over the hurdle, and means for operating said catapult device automatically upon failure of the horse to clear said hurdle.

10. An apparatus for training a horse for hurdle jumping comprising a spring-pressed propulsion lever, means for cocking said lever against the action of the spring, a pole, means for supporting said pole in position to receive the propulsion force of said lever when said lever is released, and means for releasing said lever to propel said pole against the horse as he leaps over the hurdle.

11. An apparatus for training horses for hurdle jumping comprising a pair of catapult units, each including a spring-pressed propulsion lever, a latch device for cocking said lever against the action of the spring, and means for supporting a pole near one end in position to receive the propulsion force of said lever when said lever is released, and means for releasing both of said levers simultaneously to propel said pole against the horse as he leaps over the hurdle.

12. An apparatus for training a horse for hurdle jumping comprising a catapult mechanism for propelling a pole against the horse as he leaps over the hurdle, a movable support for the top section of said hurdle carrying an electric switch closed by the tipping of said section, and means automatically operable upon the closing of said switch for operating said catapult mechanism.

13. An apparatus for training a horse to jump over a hurdle comprising a catapult mechanism for propelling a pole against the horse as he leaps over the hurdle, an electric switch for controlling the operation of said mechanism, and means automatically operable when the horse fails to clear the hurdle for operating said switch, whereby said catapult mechanism is released for pole propelling action.

CLARENCE W. VOGT.
EINO E. LAKSO.